(12) United States Patent
Chien et al.

(10) Patent No.: US 7,684,402 B2
(45) Date of Patent: Mar. 23, 2010

(54) METHOD AND NETWORK DEVICE FOR FAST LOOK-UP IN A CONNECTION-ORIENTED COMMUNICATION

(75) Inventors: Chih-Feng Chien, Hsin-Chu (TW); Chung-Yu Wei, Kao-Hsiung (TW)

(73) Assignee: Faraday Technology Corp., Hsin-Chu (TW)

( * ) Notice: Subject to any disclaimer, the term of this patent is extended or adjusted under 35 U.S.C. 154(b) by 763 days.

(21) Appl. No.: 11/383,221

(22) Filed: May 15, 2006

(65) Prior Publication Data
US 2007/0263620 A1  Nov. 15, 2007

(51) Int. Cl.
*H04L 12/28* (2006.01)
(52) U.S. Cl. .................... 370/392; 370/395.32
(58) Field of Classification Search .......... None
See application file for complete search history.

(56) References Cited

U.S. PATENT DOCUMENTS

| | | | |
|---|---|---|---|
| 6,456,594 B1 | 9/2002 | Kaplan | |
| 6,515,966 B1 | 2/2003 | Bardalai | |
| 6,591,302 B2 * | 7/2003 | Boucher et al. | 709/230 |
| 6,665,264 B1 | 12/2003 | Davison | |
| 6,693,909 B1 | 2/2004 | Mo | |
| 7,362,772 B1 * | 4/2008 | Alfieri et al. | 370/429 |
| 2005/0165885 A1 * | 7/2005 | Wong | 709/201 |
| 2005/0169309 A1 * | 8/2005 | Tripathi et al. | 370/469 |
| 2005/0182841 A1 * | 8/2005 | Sharp | 709/228 |
| 2005/0272386 A1 * | 12/2005 | Kawakami et al. | 455/151.2 |
| 2007/0097885 A1 * | 5/2007 | Traversat et al. | 370/254 |
| 2007/0127525 A1 * | 6/2007 | Sarangam et al. | 370/469 |
| 2007/0253430 A1 * | 11/2007 | Minami et al. | 370/395.52 |
| 2008/0215633 A1 * | 9/2008 | Dunkeld et al. | 707/104.1 |

FOREIGN PATENT DOCUMENTS

TW           232653           5/2005

* cited by examiner

*Primary Examiner*—Phirin Sam
(74) *Attorney, Agent, or Firm*—Winston Hsu (57) ABSTRACT

A method for fast look-up in a connection-oriented communication includes generating a connection associated information according to peer information of a first peer and a second peer, storing the connection associated information into the first peer and the second peer, and building a connection between the first peer and the second peer according to the connection associated information. Generating the connection associated information includes generating an index and a way.

9 Claims, 7 Drawing Sheets

METHOD AND NETWORK DEVICE FOR FAST LOOK-UP IN A CONNECTION-ORIENTED COMMUNICATION

BACKGROUND OF THE INVENTION

1. Field of the Invention

The present invention relates to a method and network device for fast look-up in a connection-oriented communication, and more particularly, to a method and network device utilizing an index and a way to reduce comparison times.

2. Description of the Prior Art

In the modern world of information, the need for wireless LAN increases day by day. Therefore, usage of wireless networks is getting widely spread. There are all kinds of network access protocols, where transmission control protocol (TCP) is one of the most important protocols. TCP is a transmission protocol that provides reliable, connection-oriented, and byte-stream oriented transmission services. Furthermore, user datagram protocol (UDP) is another important protocol. UDP is a transmission protocol that provides unreliable and not connection-oriented transmission services. Due to TCP always arranging pairs of IPs, they are combined into so-called TCP/IP protocol group.

Connection-oriented transmission handshakes with a host for confirming that the host is ready to receive data before starting to transfer data. After handshaking, the connection is built.

Figure 1:
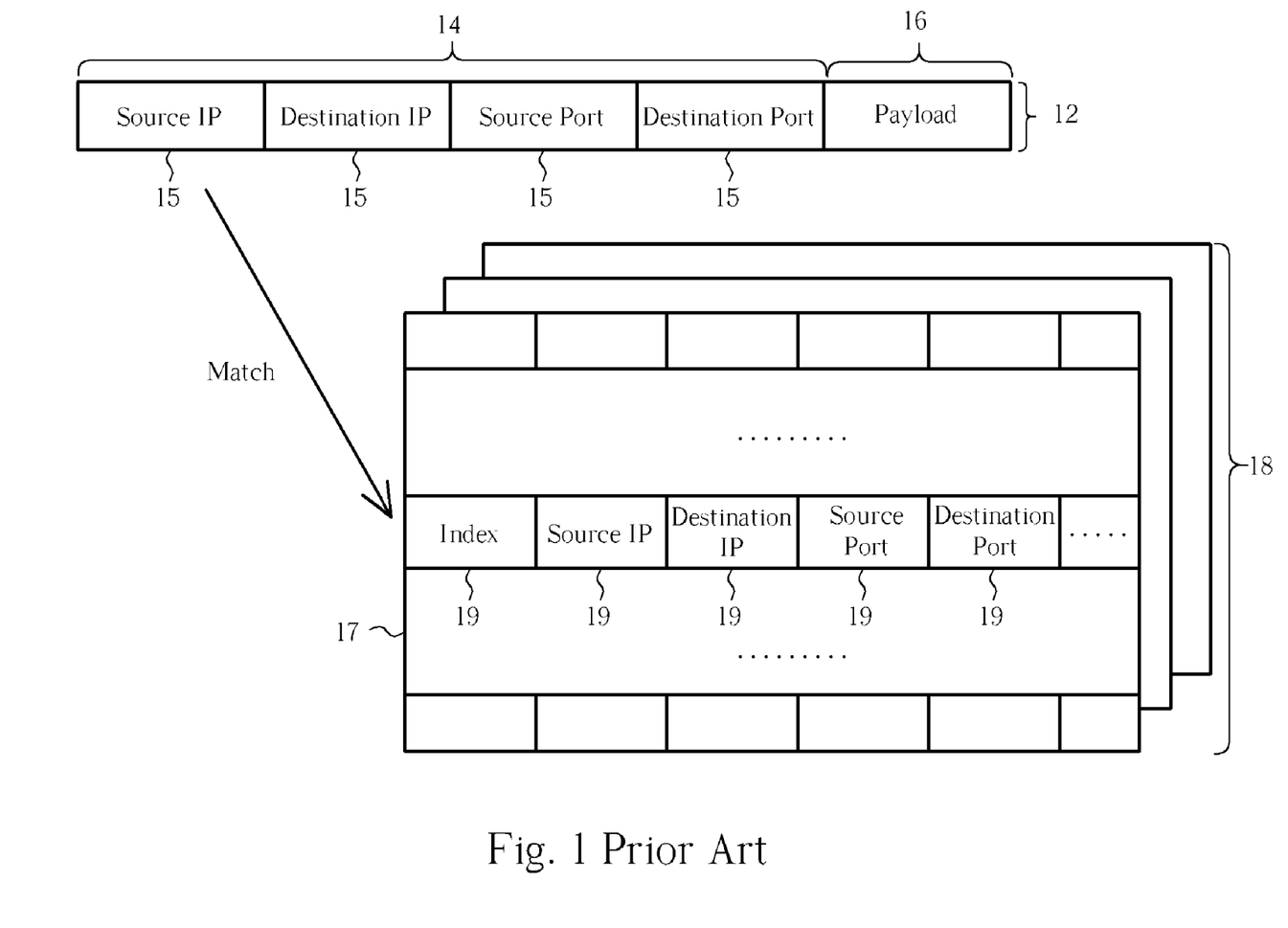
FIG. 1 is a diagram of a look-up mechanism in a connection-oriented communication according to the prior art.

Please refer to FIG. 1. FIG. 1 is a diagram of a look-up mechanism in a connection-oriented communication according to the prior art. Assume that a first peer A wants to exchange data with a second peer B. The first peer A sends a request packet SYN to the second peer B. When the second peer B receives the request packet SYN, the second peer B sends a response packet SYN-ACK to the first peer A. When receiving the response packet SYN-ACK, the first peer A sends a response packet ACK to the second peer B. Therefore, the connection between the first peer A and the second peer B is built. Connection information is maintained in both the first peer A and the second peer B. As shown in FIG. 1, when the first peer A wants to send a packet 12 to the second peer B, the first peer A appends connection information into a header 14 of the packet 12 and sends the packet 12 to the second peer B. When receiving the packet 12, the second peer B checks the header 14 and uses connection information to run a hash function for getting an index. The packet 12 includes the header 14 and a payload 16. The header 14 includes a plurality of fields 15 to store data like source IP, destination IP, source port, and destination port. The second peer B includes a connection table 18, which includes a plurality of ways 17. Each way includes a plurality of fields 19 for storing data like source IP, destination IP, source port, and destination port. After finding out the index and comparing the content of the fields 19 with the fields 15, the second peer B finds a way 17 having the same contents as the fields 15.

Figure 2:
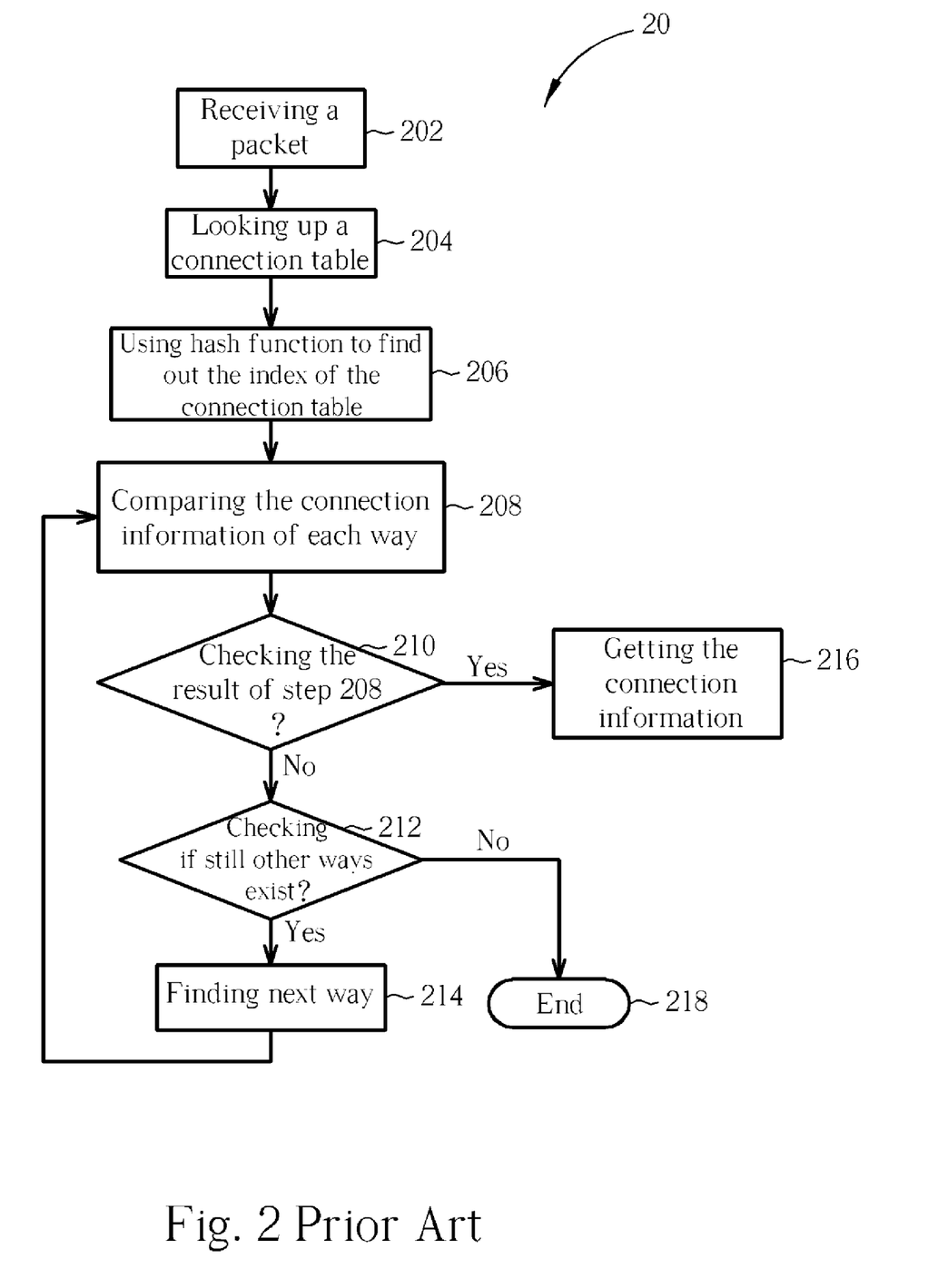
FIG. 2 is a flow chart of the look-up method in a connection-oriented communication according to the prior art.

Please refer to FIG. 2 and FIG. 1. FIG. 2 is a flow chart 20 of the look-up method in a connection-oriented communication according to the prior art. Flow chart 20 includes the following steps:

Step 202: Receiving a packet.
Step 204: Looking up a connection table.
Step 206: Using hash function to find out the index of the connection table.
Step 208: Comparing the connection information of each way.
Step 210: Checking the result of step 208.
Step 212: Checking if still other ways exist.
Step 214: Finding next way.
Step 216: Getting the connection information.
Step 218: The end.

In step 206, using the hash function includes a plurality of parameters such as data like source IP, destination IP, source port, and destination port. Running a hash function can get an index as the entrance of the connection table, but wastes time. In step 208, after finding the entrance of the connection table, the mechanism compares all connection information corresponding with the way (source IP, destination IP, source port, and destination port are fully identical).

Before building a connection between two peers, running a hash function and comparing ways several times is necessary. But running a hash function takes a lot of time. If a server connects with 64 k (or above) clients, the connection table is composed of 1024 indexes each having 64 ways. The prior art method needs to run a hash function and compare ways 64 times, wasting time and costs.

SUMMARY OF THE INVENTION

The claimed invention provides a method for fast look-up in a connection-oriented communication. The method includes generating a connection associated information according to peer information of a first peer and a second peer, where generating the connection associated information includes generating an index and a way. The generated connection associated information is stored into the first peer and the second peer. A connection between the first peer and the second peer is then built according to the connection associated information.

The claimed invention provides a network device for fast look-up in a connection-oriented communication. The network device includes a central processing unit, a chipset, a network interface circuit, and a storage device. The central processing unit is used for executing commands. The chipset is coupled to the central processing unit for coordinating data exchange. The network interface circuit is coupled to the chipset for accessing network resources. The network interface circuit includes a medium access control circuit for managing access to a network medium and a transceiver circuit for transferring and receiving network information. The storage device is coupled to the chipset. The storage device includes a connection table that is connection associated information between the network device and another network device.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
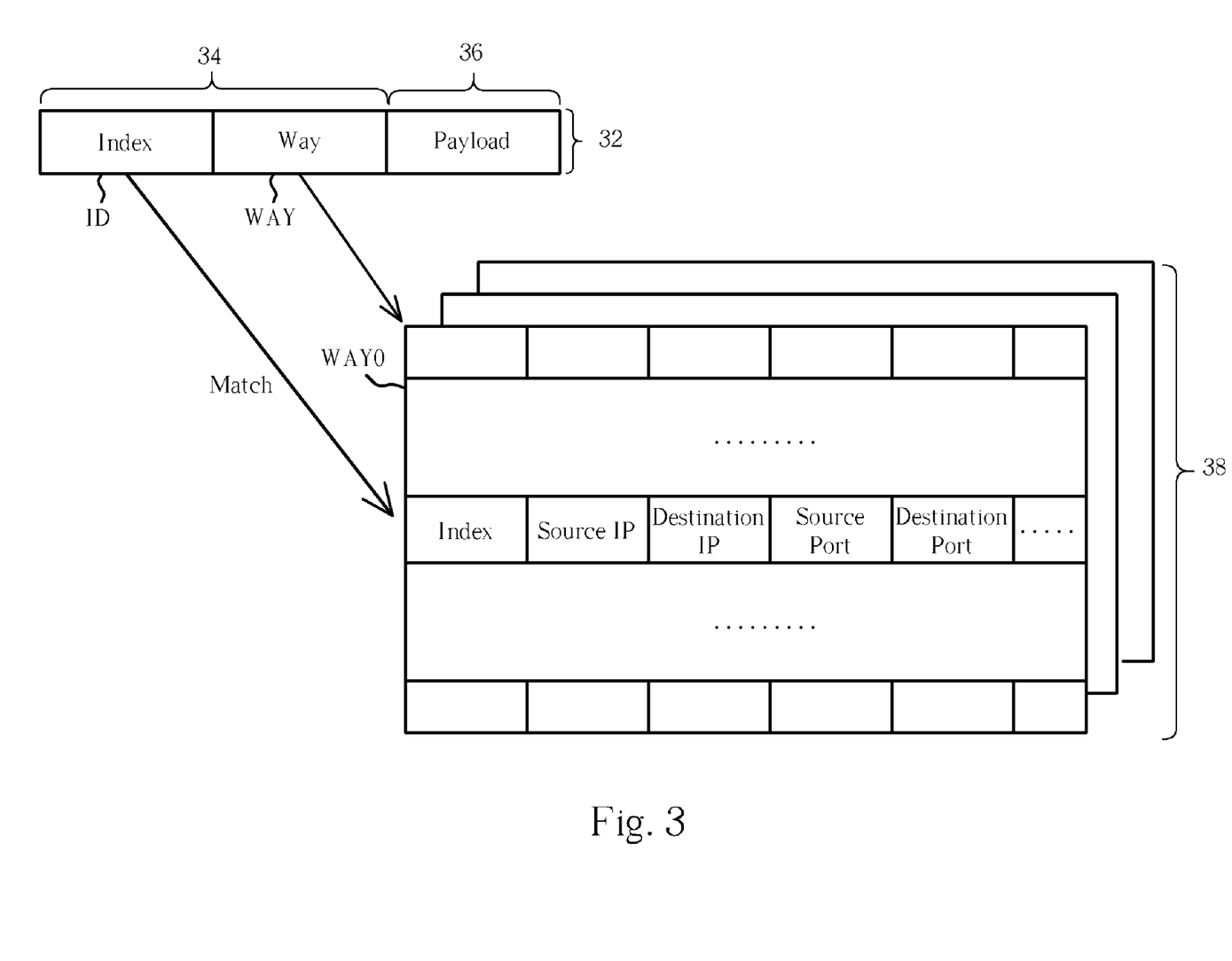
FIG. 3 is a diagram of a look-up mechanism according to the present invention.

Please refer to FIG. 3. FIG. 3 is a diagram of a look-up mechanism according to the present invention. As shown in FIG. 3, when the first peer A wants to send a packet 32 to the second peer B, the first peer A places the connection information in the header 34 of the packet 32. The packet 32 includes the header 34 and a payload 36. The header 34 includes two fields to store an index ID and a way WAY which are connection associated information generated according to the peer information of the first peer A and the second peer B. The second peer B includes a connection table 38 for storing a plurality of indexes and ways. For example, if the size of the connection table 38 is 1024×64, 10 bits are used to store the plurality of indexes ID0-ID1023 and 6 bits are used to store the plurality of ways WAY0-WAY63. When the second peer B receives the packet 32, the second peer B must check the index ID and the way WAY. The second peer B uses the index ID to point out the entrance of the connection table 38 and uses the way WAY to locate an agreeable way WAY0. The way WAY0 includes a plurality of fields to store indexes, source IP, destination IP, source port, and destination port. The field storing the index ID0 is the same as the index ID, and the way WAY0 is the same as the way WAY.

Figure 4:
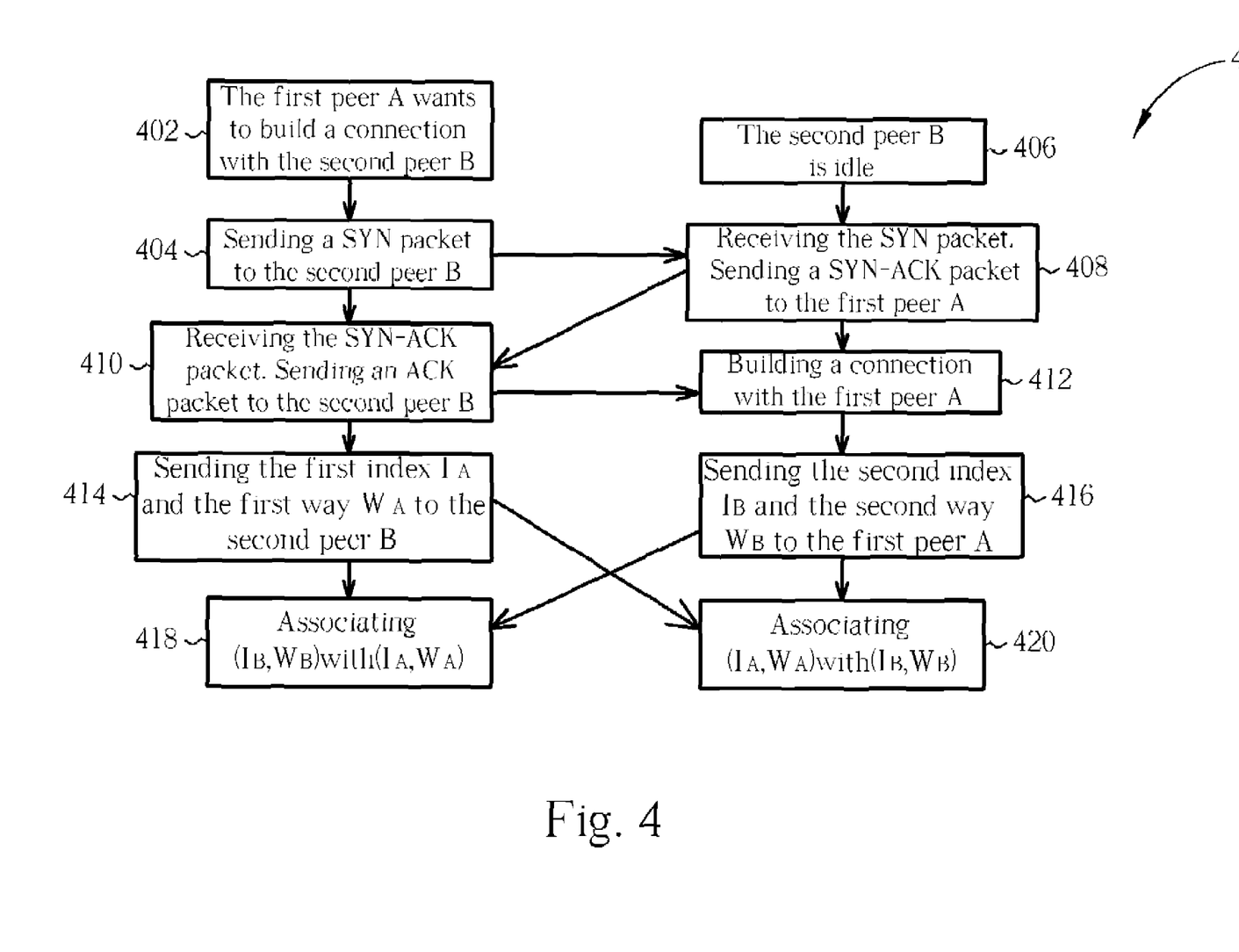
FIG. 4 is a flow chart building a connection according to the present invention.

Please refer to FIG. 4, which is a flow chart 40 building a connection according to the present invention. Flow chart 40 includes the following steps:

Step 402: The first peer A wants to build a connection with the second peer B.

Step 404: The first peer A sends a SYN packet to the second peer B.

Step 406: The second peer B is idle.

Step 408: The second peer B receives the SYN packet. The second peer B sends a SYN-ACK packet to the first peer A.

Step 410: The first peer A receives the SYN-ACK packet. The first peer A sends an ACK packet to the second peer B.

Step 412: The first peer A and the second peer B build a connection.

Step 414: The first peer A sends the first index $I_A$ and the first way $W_A$ to the second peer B.

Step 416: The second peer B sends the second index $I_B$ and the second way $W_B$ to the first peer A.

Step 418: The first peer A associates $(I_A, W_A)$ with $(I_B, W_B)$.

Step 420: The second peer B associates $(I_B, W_B)$ with $(I_A, W_A)$.

As shown in FIG. 4, the left half part of the flow chart 40 is the process of the first peer A, and the right half part of the flow chart 40 is the process of the second peer B. In step 418 and step 420, when the first peer A builds a connection with the second peer B, they associate $(I_A, W_A)$ with $(I_B, W_B)$ as the connection association information for future entrances to the connection table.

Figure 5:
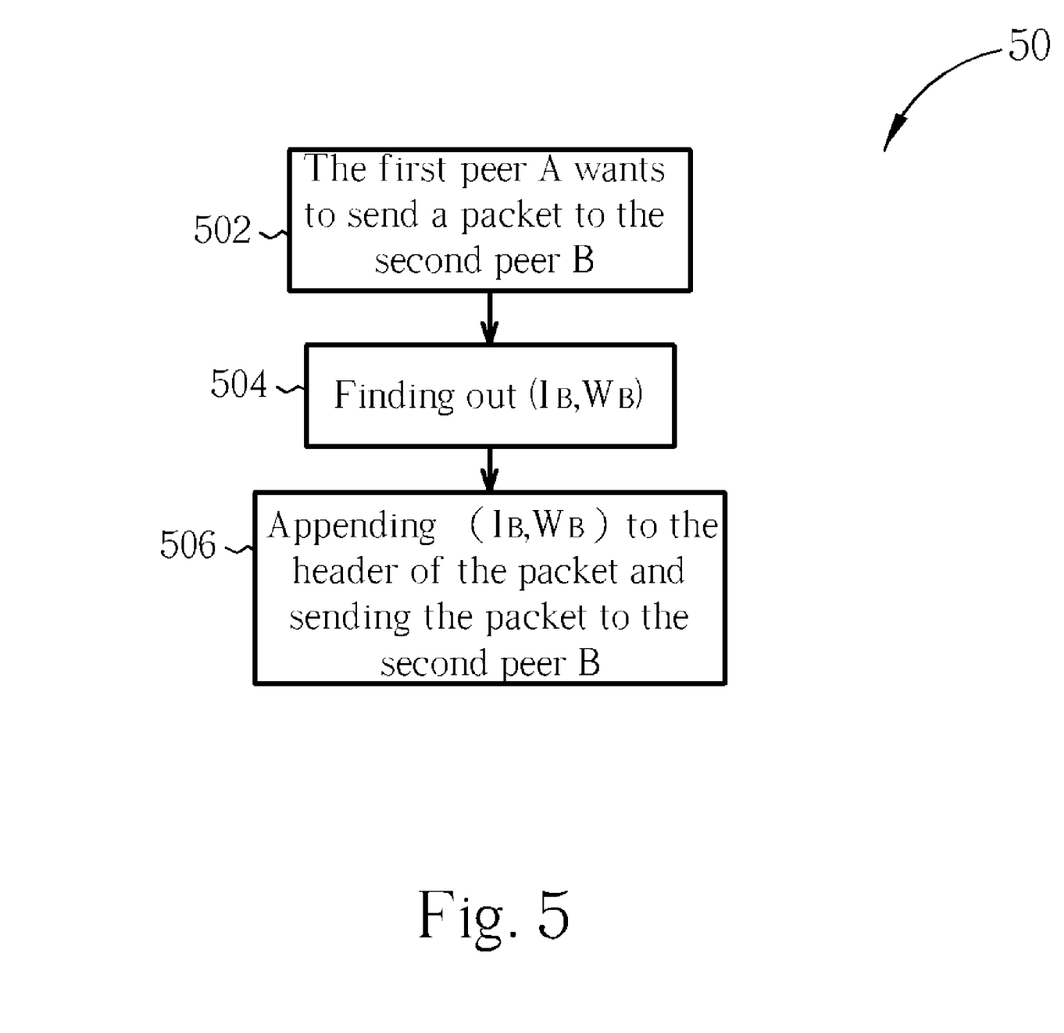
FIG. 5 is a flow chart illustrating the process of the first peer in FIG. 4.

Please refer to FIG. 5, which is a flow chart 50 illustrating the process of the first peer A in FIG. 4. Flow chart 50 includes the following steps:

Step 502: The first peer A wants to send a packet to the second peer B.

Step 504: The first peer A finds out $(I_B, W_B)$.

Step 506: The first peer A appends $(I_B, W_B)$ to the header of the packet and sends the packet to the second peer B.

When the connection between the first peer A and the second peer B was previously built, the first peer A and the second peer B store the connection associated information $(I_A, W_A)$ and $(I_B, W_B)$. When the first peer A wants to send a packet to the second peer B, the first peer A obtains the stored $(I_B, W_B)$ and sends the packet to the second peer B.

Figure 6:
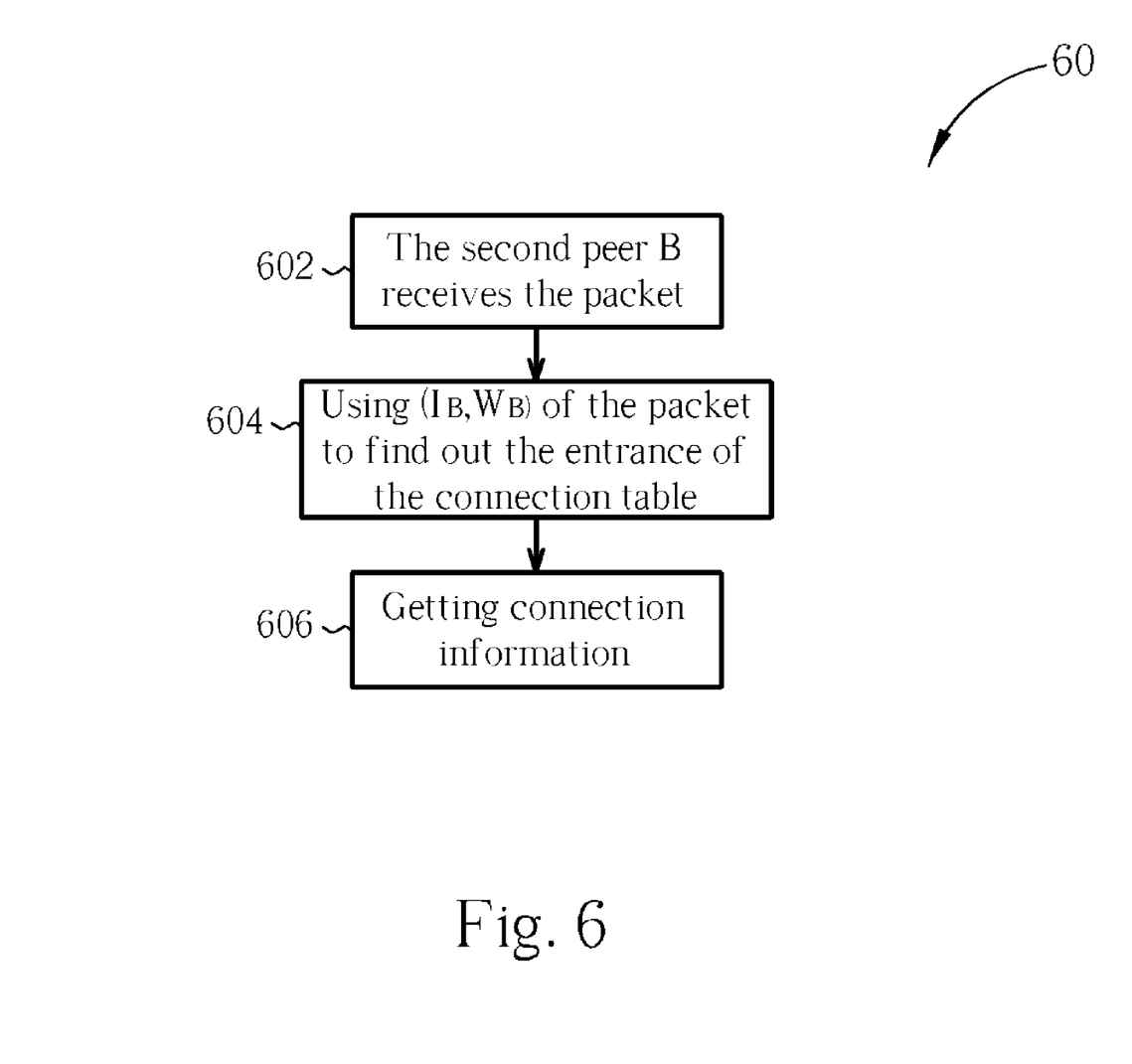
FIG. 6 is a flow chart illustrating the process of the second peer in FIG. 4.

Please refer to FIG. 6, which is a flow chart 60 illustrating the process of the second peer B in FIG. 4. Flow chart 60 includes the following steps:

Step 602: The second peer B receives the packet.

Step 604: The second peer B uses $(I_B, W_B)$ of the packet to find out the entrance of the connection table.

Step 606: The second peer B gets connection information.

The connection between the first peer A and the second peer B was already built and the connection associated information $(I_A, W_A)$ and $(I_B, W_B)$ were stored. Thus, when the second peer B receives the packet, the second peer B obtains the stored $(I_B, W_B)$ to find out an agreeable index and way in the connection table.

Figure 7:
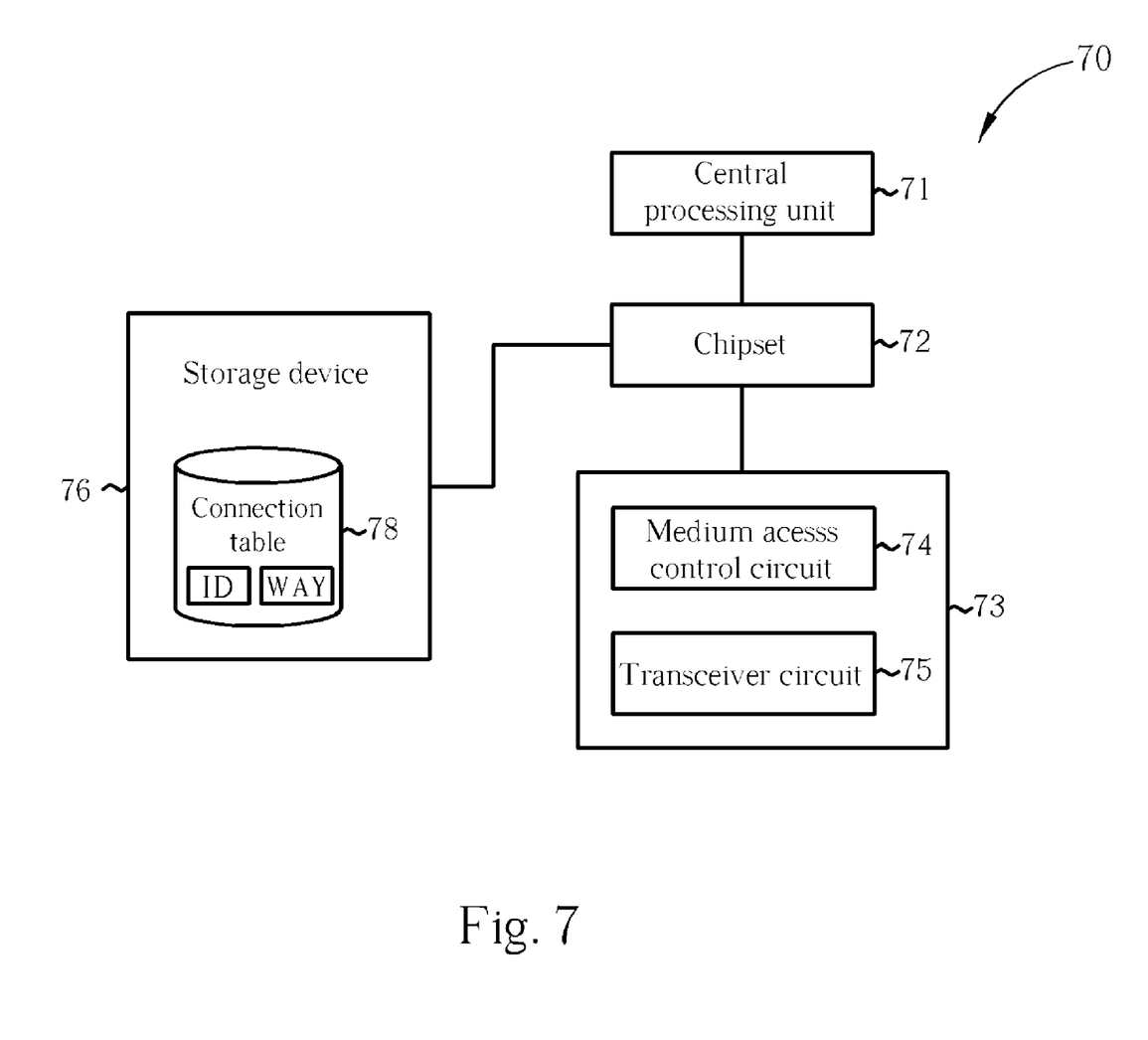
FIG. 7 is a network device for fast look-up according to the present invention.

Please refer to FIG. 7. FIG. 7 is a network device 70 for fast look-up according to the present invention. The network device 70 includes a central processing unit 71, a chipset 72, a network interface circuit 73, and a storage device 76. The central processing unit 71 is used for executing commands. The chipset 72 is coupled to the central processing unit 71 for coordinating data exchange. The network interface circuit 73 is coupled to the chipset 72 for accessing network resources. The network interface circuit 73 includes a medium access control circuit 74 for managing access to a network medium and a transceiver circuit 75 for transferring and receiving network information. The storage device 76 is coupled to the chipset 72. The storage device 76 comprises a connection table 78 that is connection associated information between the network device and another network device. The connection table 78 includes an index ID and a way WAY. The network device 70 is a member of a network system or a computer system.

The above-mentioned embodiments illustrate but do not limit the present invention. The size of the connection table 38 is not limited to 1024×64. The number of bits for storing the index and the way are not limited to 10 bits and 6 bits as they depend on a user's demand.

In conclusion, the present invention provides a method for fast look-up in a connection-oriented communication. The method reduces searching and comparing time by a wide margin. Storing the index and the way into the header of the packet only takes some bits which costs no extra money. The present invention performs well especially for the system with larger amounts clients.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for fast look-up in a connection-oriented communication, the method comprising:

generating a connection associated information having an index and a way according to peer information of a first peer and a second peer;

storing the connection associated information having the index and the way into the first peer and the second peer by connecting the index and the way to a connection table of the first peer and the second peer;

the first peer appending the connection associated information having the index and the way to a packet;

the first peer delivering the packet to the second peer;

the second peer obtaining an entry of the connection table of the second peer according to the connection associated information having the index and the way; and building a connection between the first peer and the second peer according to the connection associated information having the index and the way.

2. A network device for fast look-up in a connection-oriented communication, the device comprising:
   a central processing unit for executing commands;
   a chipset coupled to the central processing unit for coordinating data exchange;
   a network interface circuit coupled to the chipset for accessing network resources, the network interface circuit comprising:
      a medium access control circuit for managing access to a network medium; and
      a transceiver circuit for transferring and receiving network information; and
   a storage device coupled to the chipset, the storage device comprising a connection table that is connection associated information between the network device and another network device, wherein the connection table comprises an index and a way, and the index is used for pointing out an entrance of the connection table and the way is used for locating an agreeable way among ways of the connection table.

3. The network device of claim 2, wherein the network device is a member of a network system.

4. The network device of claim 3, wherein the network device is a computer system.

5. The method of claim 1 further comprising:
   building a previous connection between the first peer and the second peer;
   sending the peer information of the first peer to the second peer when the previous connection is built; and
   sending the peer information of the second peer to the first peer when the previous connection is built;
   wherein the previous connection is built prior to building the connection between the first peer and the second peer according to the connection associated information.

6. A method for fast look-up in a connection-oriented communication, the method comprising:
   generating a connection associated information according to peer information of a first peer and a second peer;
   connecting the connection associated information to a connection table of the first peer and the second peer;
   the first peer appending the connection associated information to a packet;
   the first peer delivering the packet to the second peer;
   the second peer obtaining an entry of the connection table of the second peer according to connection associated information; and
   building a connection between the first peer and the second peer according to the connection associated information.

7. A method for fast look-up in a connection-oriented communication, the method comprising:
   building a first connection between the first peer and the second peer;
   sending peer information of the first peer to the second peer when the first connection is built;
   sending peer information of the second peer to the first peer when the first connection is built;
   generating a connection associated information according to the peer information of the first peer and the second peer;
   storing the connection associated information into the first peer and the second peer; and
   building a second connection between the first peer and the second peer according to the connection associated information;
   wherein the first connection is built prior to building the second connection between the first peer and the second peer according to the connection associated information.

8. A network device for fast look-up in a connection-oriented communication, the device comprising:
   a central processing unit for executing commands;
   a chipset coupled to the central processing unit for coordinating data exchange;
   a network interface circuit coupled to the chipset for accessing network resources, the network interface circuit comprising:
      a medium access control circuit for managing access to a network medium; and
      a transceiver circuit for transferring and receiving network information; and
   a storage device coupled to the chipset, the storage device comprising a connection table that is connection associated information between the network device and a second network device, wherein the connection table comprises an index and a way;
   wherein the network device obtains an entry of the connection table after receiving a packed appended with the index and the way from the second network device, and a connection is built between the network device and the second network device according to the connection associated information.

9. A network device for fast look-up in a connection-oriented communication, the device comprising:
   a central processing unit for executing commands;
   a chipset coupled to the central processing unit for coordinating data exchange;
   a network interface circuit coupled to the chipset for accessing network resources, the network interface circuit comprising:
      a medium access control circuit for managing access to a network medium; and
      a transceiver circuit for transferring and receiving network information; and
   a storage device coupled to the chipset;
   wherein when a first connection is built between the network device and the second network device, the network device sends peer information of the network device to the second network device and receives peer information of the second network device from the second network device so as to generate and store a connection associated information in the storage device; and
   a second connection is built between the network device and the second network device according to the connection associated information after the first connection is built.

* * * * *